(12) United States Patent
Letient

(10) Patent No.: US 6,476,335 B2
(45) Date of Patent: *Nov. 5, 2002

(54) DRAW-OUT MECHANISM FOR MOLDED CASE CIRCUIT BREAKERS

(75) Inventor: Patrick Letient, Saint Quentin (FR)

(73) Assignee: General Electric Company, Schenectady, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 09/732,412

(22) Filed: Dec. 7, 2000

(65) Prior Publication Data

US 2001/0022263 A1 Sep. 20, 2001

(30) Foreign Application Priority Data

Mar. 17, 2000 (FR) .............................. 00 03485

(51) Int. Cl.⁷ .............................................. H02B 11/00
(52) U.S. Cl. ..................................... 200/50.26; 200/308
(58) Field of Search ................ 200/50.01, 50.21–50.26, 200/308; 361/605–615

(56) References Cited

U.S. PATENT DOCUMENTS

| | | | |
|---|---|---|---|
| 2,340,682 A | 2/1944 | Powell | 200/147 |
| 2,719,203 A | 9/1955 | Gelzheiser et al. | 200/144 |
| 2,937,254 A | 5/1960 | Ericson | 200/114 |
| 3,158,717 A | 11/1964 | Jencks et al. | 200/116 |
| 3,162,739 A | 12/1964 | Klein et al. | 200/88 |
| 3,197,582 A | 7/1965 | Norden | 200/50 |
| 3,307,002 A | 2/1967 | Cooper | 200/116 |
| 3,517,356 A | 6/1970 | Hanafusa | 335/16 |
| 3,631,369 A | 12/1971 | Menocal | 337/110 |
| 3,803,455 A | 4/1974 | Willard | 317/33 SC |
| 3,883,781 A | 5/1975 | Cotton | 317/14 R |
| 4,112,269 A | 9/1978 | Nelson et al. | 200/50 AA |
| 4,129,792 A | 12/1978 | Bruchet | 200/153 G |

(List continued on next page.)

FOREIGN PATENT DOCUMENTS

| | | |
|---|---|---|
| BE | 819 008 A | 12/1974 |
| BE | 897 691 A | 1/1984 |
| DE | 12 27 978 | 11/1966 |
| DE | 30 47 360 | 6/1982 |
| DE | 38 02 184 | 8/1989 |
| DE | 38 43 277 | 6/1990 |
| DE | 44 19 240 | 1/1995 |
| EP | 0 061 092 | 9/1982 |
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |

(List continued on next page.)

Primary Examiner—Michael Friedhofer
(74) Attorney, Agent, or Firm—Cantor Colburn LLP

(57) ABSTRACT

The draw out mechanism includes a crank, screw, collar and cam, which operate such that as the crank rotates, the collar translates along the screw. The movement of the pin disposed in the slot, rotates the cam as viewed about a axis of rotation. As the cam rotates about the axis of rotation, the pin moves within slot causing mobile side plates to move toward the front or back of the draw-out unit. A circuit breaker is connected to side plate and is positioned in CONNECT, DISCONNECT, and TEST positions by motion of the side plate. An indicator provides visual indication of the breaker's position. A locking system locks the draw-out mechanism in the DISCONNECT position.

9 Claims, 8 Drawing Sheets

U.S. PATENT DOCUMENTS

| | | | |
|---|---|---|---|
| 4,144,513 A | 3/1979 | Shafer et al. .................. 335/46 |
| 4,158,119 A | 6/1979 | Krakik ....................... 200/240 |
| 4,165,453 A | 8/1979 | Hennemann ............ 200/153 G |
| 4,166,988 A | 9/1979 | Ciarcia et al. .................. 335/9 |
| 4,220,934 A | 9/1980 | Wafer et al. .................... 335/16 |
| 4,255,732 A | 3/1981 | Wafer et al. .................... 335/16 |
| 4,259,651 A | 3/1981 | Yamat ........................ 335/16 |
| 4,263,492 A | 4/1981 | Maier et al. ................. 200/288 |
| 4,276,527 A | 6/1981 | Gerbert-Gaillard et al. ... 335/39 |
| 4,297,663 A | 10/1981 | Seymour et al. .............. 335/20 |
| 4,301,342 A | 11/1981 | Castonguay et al. .. 200/153 SC |
| 4,360,852 A | 11/1982 | Gilmore ...................... 361/98 |
| 4,368,444 A | 1/1983 | Preuss et al. ............... 335/166 |
| 4,375,021 A | 2/1983 | Pardini et al. .......... 200/147 B |
| 4,375,022 A | 2/1983 | Daussin et al. ......... 200/148 R |
| 4,376,270 A | 3/1983 | Staffen ........................ 335/21 |
| 4,383,146 A | 5/1983 | Bur ......................... 200/17 R |
| 4,392,036 A | 7/1983 | Troebel et al. .............. 200/322 |
| 4,393,283 A | 7/1983 | Masuda ................... 200/51.09 |
| 4,401,872 A | 8/1983 | Boichot-Castagne et al. ....... 200/153 G |
| 4,409,573 A | 10/1983 | DiMarco et al. ............... 335/16 |
| 4,435,690 A | 3/1984 | Link et al. .................... 335/37 |
| 4,467,297 A | 8/1984 | Boichot-Castagne et al. .. 335/8 |
| 4,468,645 A | 8/1984 | Gerbert-Gaillard et al. ... 335/42 |
| 4,470,027 A | 9/1984 | Link et al. .................... 335/16 |
| 4,479,143 A | 10/1984 | Watanabe et al. ............. 358/44 |
| 4,488,133 A | 12/1984 | McClellan et al. ........... 335/16 |
| 4,492,941 A | 1/1985 | Nagel ......................... 335/13 |
| 4,541,032 A | 9/1985 | Schwab ..................... 361/331 |
| 4,546,224 A | 10/1985 | Mostosi ................. 200/153 G |
| 4,550,360 A | 10/1985 | Dougherty ................... 361/93 |
| 4,562,419 A | 12/1985 | Preuss et al. ............... 335/195 |
| 4,589,052 A | 5/1986 | Dougherty ................... 361/94 |
| 4,595,812 A | 6/1986 | Tamaru et al. .............. 200/307 |
| 4,611,187 A | 9/1986 | Banfi ......................... 335/195 |
| 4,612,430 A | 9/1986 | Sloan et al. ................. 200/327 |
| 4,616,198 A | 10/1986 | Pardini ........................ 335/16 |
| 4,622,444 A | 11/1986 | Kandatsu et al. ............ 200/303 |
| 4,631,625 A | 12/1986 | Alexander et al. ............. 361/94 |
| 4,642,431 A | 2/1987 | Tedesco et al. ......... 200/153 G |
| 4,644,438 A | 2/1987 | Puccinelli et al. ............. 361/75 |
| 4,649,247 A | 3/1987 | Preuss et al. ................ 200/244 |
| 4,658,322 A | 4/1987 | Rivera ......................... 361/37 |
| 4,672,501 A | 6/1987 | Bilac et al. ................... 361/96 |
| 4,675,481 A | 6/1987 | Markowski et al. .... 200/144 R |
| 4,682,264 A | 7/1987 | Demeyer ..................... 361/96 |
| 4,689,712 A | 8/1987 | Demeyer ..................... 361/96 |
| 4,694,373 A | 9/1987 | Demeyer ..................... 361/96 |
| 4,710,845 A | 12/1987 | Demeyer ..................... 361/96 |
| 4,717,985 A | 1/1988 | Demeyer ..................... 361/96 |
| 4,733,211 A | 3/1988 | Castonguay et al. ........ 335/192 |
| 4,733,321 A | 3/1988 | Lindeperg ................... 361/96 |
| 4,743,715 A | 5/1988 | Gaillard et al. ......... 200/50 AA |
| 4,764,650 A | 8/1988 | Bur et al. ............... 200/153 G |
| 4,768,007 A | 8/1988 | Mertz et al. ............... 335/202 |
| 4,780,786 A | 10/1988 | Weynachter et al. .......... 361/87 |
| 4,831,221 A | 5/1989 | Yu et al. .................... 200/553 |
| 4,870,531 A | 9/1989 | Danek ........................ 361/93 |
| 4,883,931 A | 11/1989 | Batteux et al. ......... 200/148 R |
| 4,884,047 A | 11/1989 | Baginski et al. .............. 335/10 |
| 4,884,164 A | 11/1989 | Dziura et al. ................. 361/97 |
| 4,900,882 A | 2/1990 | Bernard et al. .......... 200/147 R |
| 4,910,485 A | 3/1990 | Bolongeat-Mobleu et al. ............. 335/195 |
| 4,914,541 A | 4/1990 | Tripodi et al. ................ 361/94 |
| 4,916,420 A | 4/1990 | Bartolo et al. .............. 335/172 |
| 4,916,421 A | 4/1990 | Pardini et al. .............. 335/185 |
| 4,926,282 A | 5/1990 | McGhie ..................... 361/102 |
| 4,935,590 A | 6/1990 | Malkin et al. .......... 200/148 A |
| 4,937,706 A | 6/1990 | Schueller et al. ........... 361/396 |
| 4,939,492 A | 7/1990 | Raso et al. .................... 335/42 |
| 4,943,691 A | 7/1990 | Mertz et al. ................ 200/151 |
| 4,943,888 A | 7/1990 | Jacob et al. ................... 361/96 |
| 4,950,855 A | 8/1990 | Bolonegeat-Mobleu et al. ........ 200/148 A |
| 4,951,019 A | 8/1990 | Gula .......................... 335/166 |
| 4,952,897 A | 8/1990 | Barnel et al. ................ 335/147 |
| 4,958,135 A | 9/1990 | Baginski et al. ............... 335/8 |
| 4,965,543 A | 10/1990 | Batteux ...................... 335/174 |
| 4,983,788 A | 1/1991 | Pardini ..................... 200/16 R |
| 5,001,313 A | 3/1991 | Leclerq et al. .......... 200/148 B |
| 5,004,878 A | 4/1991 | Seymour et al. ........ 200/144 R |
| 5,029,301 A | 7/1991 | Nebon et al. .................. 335/16 |
| 5,030,804 A | 7/1991 | Abri ........................... 200/323 |
| 5,057,655 A | 10/1991 | Kersusan et al. ........ 200/148 B |
| 5,077,627 A | 12/1991 | Fraisse ........................ 361/93 |
| 5,083,081 A | 1/1992 | Barrault et al. .............. 324/126 |
| 5,095,183 A | 3/1992 | Raphard et al. ........ 200/148 A |
| 5,103,198 A | 4/1992 | Morel et al. ................... 335/6 |
| 5,115,371 A | 5/1992 | Tripodi ...................... 361/106 |
| 5,120,921 A | 6/1992 | DiMarco et al. ............ 200/401 |
| 5,132,865 A | 7/1992 | Mertz et al. ................... 361/6 |
| 5,138,121 A | 8/1992 | Streich et al. .............. 200/293 |
| 5,140,115 A | 8/1992 | Morris ...................... 200/308 |
| 5,153,802 A | 10/1992 | Mertz et al. .................. 361/18 |
| 5,155,315 A | 10/1992 | Malkin et al. .......... 200/148 R |
| 5,166,483 A | 11/1992 | Kersusan et al. ....... 200/144 A |
| 5,172,087 A | 12/1992 | Castonguay et al. ........ 335/160 |
| 5,178,504 A | 1/1993 | Falchi ........................ 411/553 |
| 5,184,717 A | 2/1993 | Chou et al. ................. 200/401 |
| 5,187,339 A | 2/1993 | Lissandrin .............. 200/148 F |
| 5,198,956 A | 3/1993 | Dvorak ...................... 361/106 |
| 5,200,724 A | 4/1993 | Gula et al. .................. 335/166 |
| 5,210,385 A | 5/1993 | Morel et al. ............. 200/146 R |
| 5,239,150 A | 8/1993 | Bolongeat-Mobleu et al. .......... 200/148 R |
| 5,260,533 A | 11/1993 | Livesey et al. ............. 200/401 |
| 5,262,744 A | 11/1993 | Arnold et al. ................. 335/8 |
| 5,280,144 A | 1/1994 | Bolongeat-Mobleu et al. .......... 200/148 R |
| 5,281,776 A | 1/1994 | Morel et al. ................ 200/144 |
| 5,296,660 A | 3/1994 | Morel et al. ............. 200/146 R |
| 5,296,664 A | 3/1994 | Crookston et al. .......... 200/401 |
| 5,298,874 A | 3/1994 | Morel et al. ................... 335/8 |
| 5,300,907 A | 4/1994 | Nereau et al. .............. 335/172 |
| 5,310,971 A | 5/1994 | Vial et al. ................... 200/244 |
| 5,313,180 A | 5/1994 | Vial et al. ..................... 335/16 |
| 5,317,471 A | 5/1994 | Izoard et al. ................ 361/105 |
| 5,331,500 A | 7/1994 | Corcoles et al. .............. 361/93 |
| 5,334,808 A | 8/1994 | Bur et al. ..................... 200/50 |
| 5,341,191 A | 8/1994 | Crookston et al. ............ 335/16 |
| 5,347,096 A | 9/1994 | Bolongeat-Mobleu et al. .......... 200/148 B |
| 5,347,097 A | 9/1994 | Bolongeat-Mobleu et al. .......... 200/148 B |
| 5,350,892 A | 9/1994 | Rozier ................... 200/144 B |
| 5,357,066 A | 10/1994 | Morel et al. .............. 200/17 R |
| 5,357,068 A | 10/1994 | Rozier ................... 200/148 R |
| 5,357,394 A | 10/1994 | Piney .......................... 361/72 |
| 5,361,052 A | 11/1994 | Ferullo et al. .............. 335/172 |
| 5,373,130 A | 12/1994 | Barrault et al. ......... 200/147 R |
| 5,379,013 A | 1/1995 | Coudert ...................... 335/17 |
| 5,424,701 A | 6/1995 | Castonguay et al. ........ 335/172 |
| 5,438,176 A | 8/1995 | Bonnardel et al. .......... 200/400 |
| 5,440,088 A | 8/1995 | Coudert et al. ............. 200/303 |
| 5,449,871 A | 9/1995 | Batteux et al. ............. 200/401 |
| 5,450,048 A | 9/1995 | Leger et al. ................ 335/132 |
| 5,451,729 A | 9/1995 | Onderka et al. .............. 200/18 |
| 5,457,295 A | 10/1995 | Tanibe et al. ............... 200/293 |
| 5,467,069 A | 11/1995 | Payet-Burin et al. ......... 335/42 |

| | | | | | | |
|---|---|---|---|---|---|---|
| 5,469,121 | A | 11/1995 | Payet-Burin ................... 335/16 | EP | 0 283 358 | 9/1988 |
| 5,475,558 | A | 12/1995 | Barjonnet et al. ............. 361/64 | EP | 0 291 374 | 11/1988 |
| 5,477,016 | A | 12/1995 | Baginski et al. .......... 200/43.11 | EP | 0 295 155 | 12/1988 |
| 5,479,143 | A | 12/1995 | Payet-Burin ................. 335/202 | EP | 0 295 158 | 12/1988 |
| 5,483,212 | A | 1/1996 | Lankuttis et al. ............ 335/132 | EP | 0 309 923 | 4/1989 |
| 5,485,343 | A | 1/1996 | Santos et al. ................ 361/115 | EP | 0 313 106 | 4/1989 |
| D367,265 | S | 2/1996 | Yamagata et al. .......... D13/160 | EP | 0 313 422 | 4/1989 |
| 5,493,083 | A | 2/1996 | Olivier ...................... 200/17 R | EP | 0 314 540 | 5/1989 |
| 5,504,284 | A | 4/1996 | Lazareth et al. ........... 200/50 R | EP | 0 331 586 | 9/1989 |
| 5,504,290 | A | 4/1996 | Baginski et al. ............. 200/401 | EP | 0 337 900 | 10/1989 |
| 5,510,761 | A | 4/1996 | Boder et al. ................. 335/172 | EP | 0 342 133 | 11/1989 |
| 5,512,720 | A | 4/1996 | Coudert et al. .............. 200/400 | EP | 0 367 690 | 5/1990 |
| 5,515,018 | A | 5/1996 | DiMarco et al. .............. 335/16 | EP | 0 371 887 | 6/1990 |
| 5,519,561 | A | 5/1996 | Mrenna et al. .............. 361/105 | EP | 0 375 568 | 6/1990 |
| 5,534,674 | A | 7/1996 | Steffens ....................... 218/154 | EP | 0 394 144 | 10/1990 |
| 5,534,832 | A | 7/1996 | Duchemin et al. ............. 335/16 | EP | 0 394 922 | 10/1990 |
| 5,534,835 | A | 7/1996 | McColloch et al. ........ 335/172 | EP | 0 399 282 | 11/1990 |
| 5,534,840 | A | 7/1996 | Cuingnet ........................ 337/1 | EP | 0 407 310 | 1/1991 |
| 5,539,168 | A | 7/1996 | Linzenich ................... 200/303 | EP | 0 452 230 | 10/1991 |
| 5,543,595 | A | 8/1996 | Mader et al. ................ 200/401 | EP | 0 555 158 | 8/1993 |
| 5,552,755 | A | 9/1996 | Fello et al. .................... 335/18 | EP | 0 560 697 | 9/1993 |
| 5,581,219 | A | 12/1996 | Nozawa et al. ............. 335/132 | EP | 0 567 416 | 10/1993 |
| 5,604,656 | A | 2/1997 | Derrick et al. ............... 361/187 | EP | 0 595 730 | 5/1994 |
| 5,608,367 | A | 3/1997 | Zoller et al. ................ 335/132 | EP | 0 619 591 | 10/1994 |
| 5,784,233 | A | 7/1998 | Bastard et al. ................ 361/36 | EP | 0 665 569 | 8/1995 |
| 5,837,949 | A * | 11/1998 | Green et al. ............. 200/50.21 | EP | 0 700 140 | 3/1996 |
| 6,005,208 | A * | 12/1999 | Castonguay ................ 200/308 | EP | 0 889 498 | 1/1999 |
| 6,160,228 | A * | 12/2000 | Gerbert-Gaillard et al. .......... 200/50.21 | FR | 2 410 353 | 6/1979 |
| | | | | FR | 2 512 582 | 3/1983 |
| 6,160,229 | A * | 12/2000 | Grelier et al. ............ 200/50.26 | FR | 2 553 943 | 4/1985 |
| 6,244,891 | B1 * | 6/2001 | Robbins et al. .......... 200/50.01 | FR | 2 592 998 | 7/1987 |
| 6,252,186 | B1 * | 6/2001 | Liebetruth et al. .......... 200/308 | FR | 2 682 531 | 4/1993 |
| 6,265,678 | B1 * | 7/2001 | Robbins et al. .......... 200/50.21 | FR | 2 697 670 | 5/1994 |
| | | | | FR | 2 699 324 | 6/1994 |
| | | | FOREIGN PATENT DOCUMENTS | FR | 2 714 771 | 7/1995 |
| EP | | 0 224 396 | 6/1987 | GB | 2 233 155 | 1/1991 |
| EP | | 0 235 479 | 9/1987 | RU | 1 227 978 | 4/1986 |
| EP | | 0 239 460 | 9/1987 | WO | 92/00598 | 1/1992 |
| EP | | 0 258 090 | 3/1988 | WO | 92/05649 | 4/1992 |
| EP | | 0 264 313 | 4/1988 | WO | 94/00901 | 1/1994 |
| EP | | 0 264 314 | 4/1988 | | | |
| EP | | 0 283 189 | 9/1988 | * cited by examiner | | |

DRAW-OUT MECHANISM FOR MOLDED CASE CIRCUIT BREAKERS

CROSS-REFERENCE TO RELATED APPLICATIONS

This Application claims the benefit of the Application Number 0003485 filed Mar. 17, 2000 in France, which is incorporated herein by reference.

BACKGROUND OF THE INVENTION

This invention relates to a draw-out unit for electrical switchgear cabinets. More specifically, this invention relates to a draw-out unit for mounting a molded case circuit breaker in a switchgear cabinet.

The use of switchgears in electrical distribution systems is well known. The switchgear houses a plurality of draw-out units, with each draw-out unit housing one or more switching devices, such as motor controllers and circuit breakers, releasably interconnected to one or more busbars. Periodically, the draw-out units are removed from the switchgear to allow for maintenance of equipment. The switching devices within the draw-out units make electrical contact with the busbars through a plurality of clip connectors, which extend from the draw-out unit. Each clip connector is electrically connected to an electrical conductor for connection to the switching devices of the switchgear. As the draw-out unit is inserted into the switchgear, the busbar slides between the two contact arms, and the contact arms frictionally engage the busbar.

Draw-out mechanisms are known in the art for use with molded case circuit breakers. One such mechanism is described in U.S. Pat. No. 4,743,715 issued May 10, 1988. These mechanisms have discrete positions for testing, installing and removing the circuit breaker. The positions are CONNECT, DISCONNECT and TEST. In the CONNECT position the circuit breaker can be closed, opened or tripped. In the DISCONNECT position the circuit breaker is in the trip position and the draw-out mechanism can be locked to prevent access to the circuit breaker. The third position is TEST, wherein the circuit breaker is disconnected from the main circuit. In the TEST position the circuit breaker can be closed, opened or tripped in order to check internal and external accessories such as auxiliary switches, shunt trip and under voltage and secondary circuits. However, draw-out mechanisms with a "test" position relate to air circuit breakers (ACB's), which are large in size. Because these draw-out mechanisms are larger in size, they also tend to be costly to produce.

BRIEF SUMMARY OF THE INVENTION

A draw-out mechanism for mounting a circuit breaker within a switchgear cabinet includes a fixed side plate arranged for mounting within the switchgear cabinet. The draw-out mechanism also includes a mobile side plate having a first pin extending therefrom. The circuit breaker is arranged to move in cooperation with the mobile side plate. A cam is pivotally disposed on the fixed side plate. The cam includes a slot disposed therein for accepting the pin extending from the mobile side plate. The pin slides within the slot as the cam pivots, thus moving said mobile side plate relative to said fixed side plate.

DETAILED DESCRIPTION OF THE INVENTION

Figure 1:
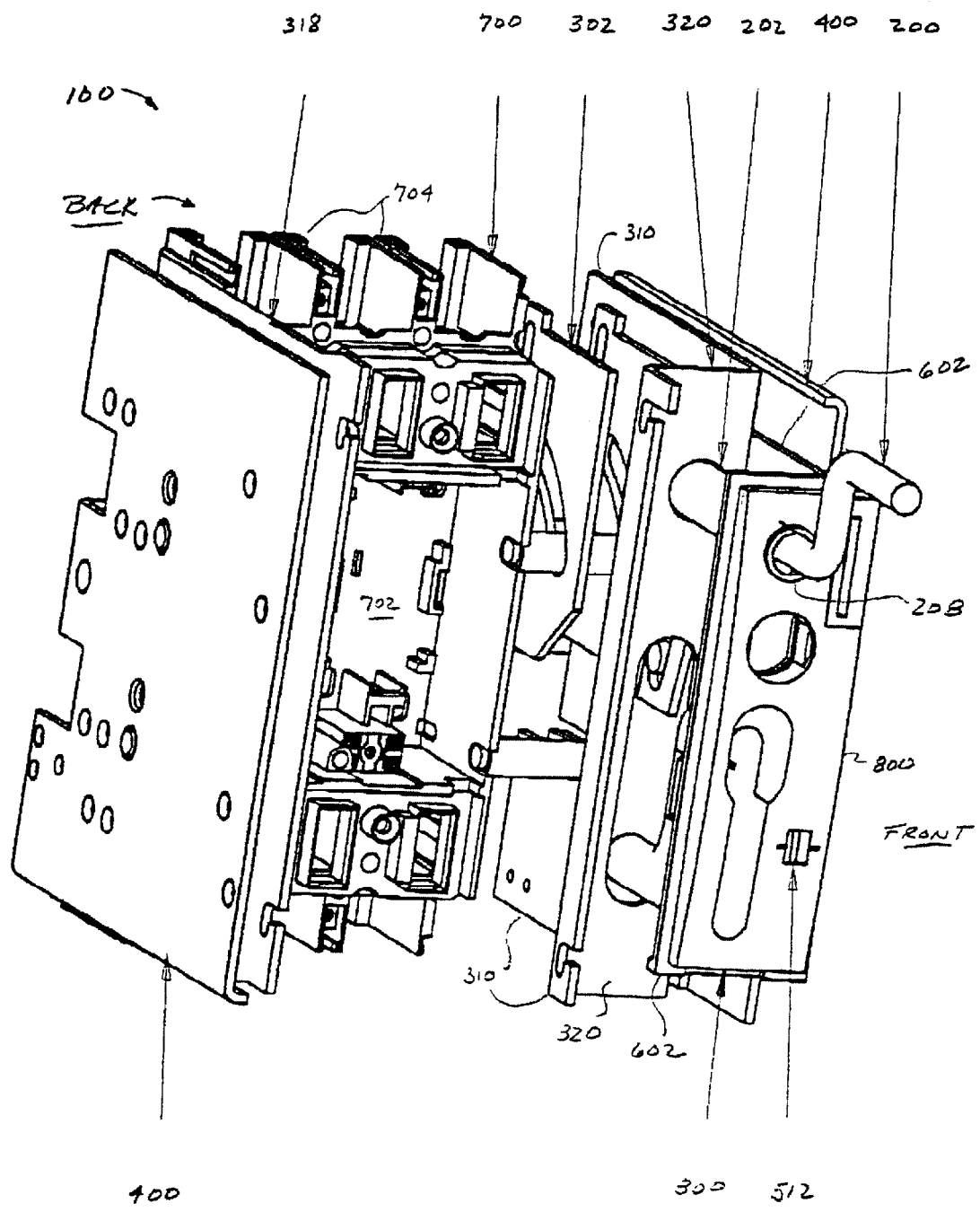
FIG. 1 is a partially exploded perspective view of the draw-out mechanism of the present invention.

Referring now to FIG. 1, the draw-out mechanism of the present invention is shown generally at 100. The draw-out mechanism 100 is generally comprised of a pair of fixed side plates 400 disposed parallel to one another. Interior to the pair of fixed side plates 400 are disposed a mobile side plate 310 and mobile side plate 318. The mobile side plate 318 comprises essentially a flat plate while the mobile side plate 310 comprises a bent plate in an essentially step like form including a front piece 320 whereby the mobile side plate 310 and the mobile side plate 318 are juxtaposed in proximity to one another. Continuing in FIG. 1, the draw-out mechanism 100 further comprises a plug-in base 700 disposed between the mobile side plate 310 and the mobile side plate 318. The plug-in base 700, the mobile side plate 310, the mobile plate 318 and the front piece 320 define an interior chamber 702 operative to accept therein a circuit breaker such as a molded case circuit breaker (MCCB, not shown). The circuit breaker (not shown) is secured to mobile side plate 318, allowing the circuit breaker to move with mobile side plate 318 in a manner described hereinafter. A cam 302 is juxtaposed between the plug-in base 700 and the mobile side plate 310. A locking slide 602 is disposed between the mobile side plate 318 and one of the fixed side plates 400. Further in FIG. 1, a screw 202 is made accessible to a crank 200 whereby the draw-out mechanism 100 may be brought to one of a plurality of positions. The draw-out mechanism 100 is connected to an electrical distribution circuit (not shown) at the clip connectors 704. An electrical socket (not shown) is fixed to base 700 within interior chamber 702 and forms a releasable connection with a plug (not shown) extending from the circuit breaker to connect the circuit breaker with the main circuit via clip connectors 704.

The aforesaid positions of the draw-out mechanism 100 are firstly that of CONNECT, wherein the circuit breaker is connected to the main electrical circuit (not shown). In the CONNECT position the circuit breaker can be closed, open or tripped. The second position is DISCONNECT, wherein the circuit breaker is disconnected (unplugged) from the main circuit. In the DISCONNECT position the circuit breaker is in the trip position and the draw-out mechanism 100 can be locked to prevent movement of the draw-out mechanism 100. The third position is TEST, wherein the circuit breaker remains disconnected (unplugged) from the main circuit. In the TEST position the circuit breaker can be closed, open or tripped in order to check internal and external accessories such as auxiliary switches, shunt trip and under voltage and secondary circuits (not shown).

Figure 2:
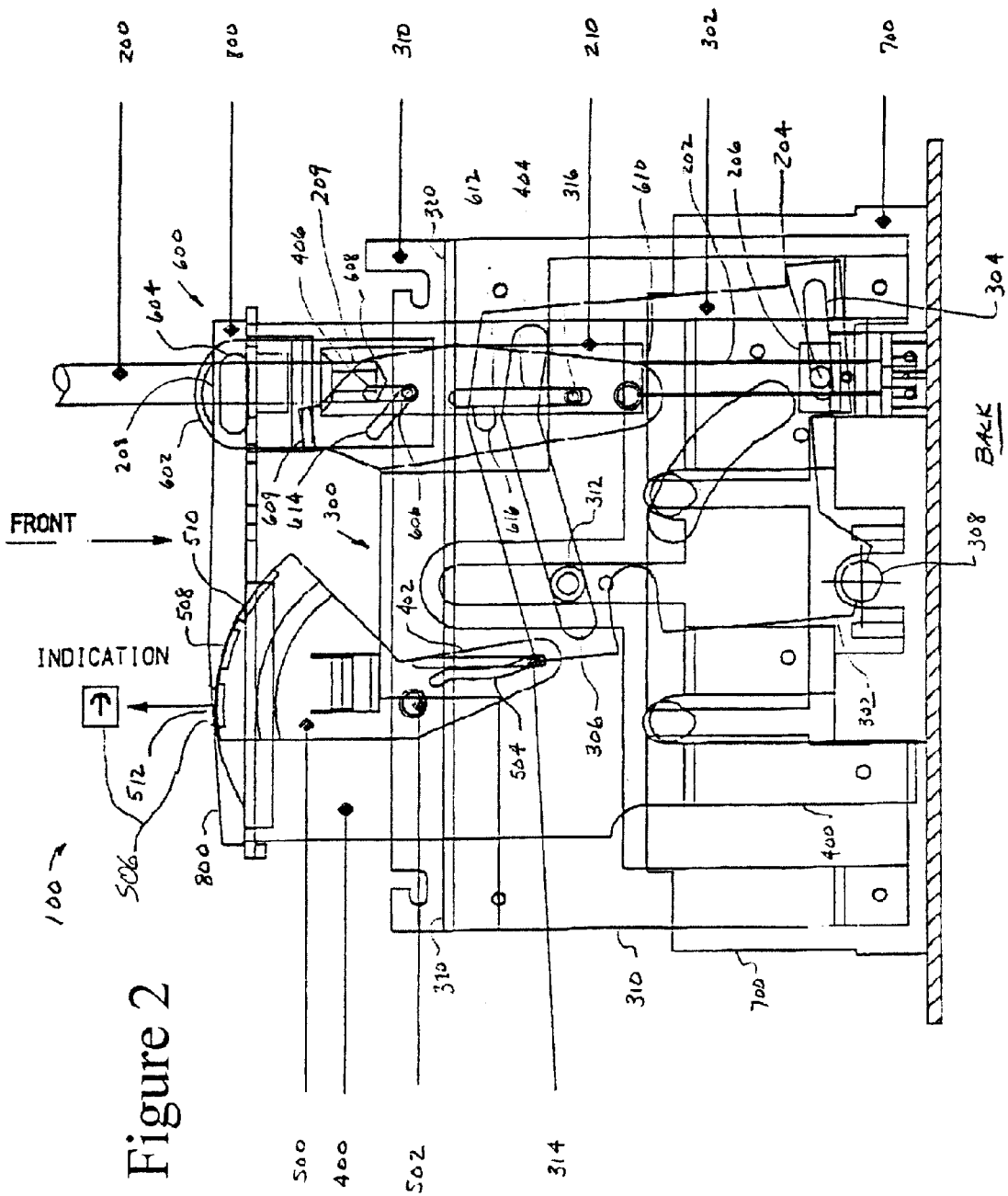
FIG. 2 is a side view of the draw-out mechanism of FIG. 1 in the CONNECT position.
Figure 3:
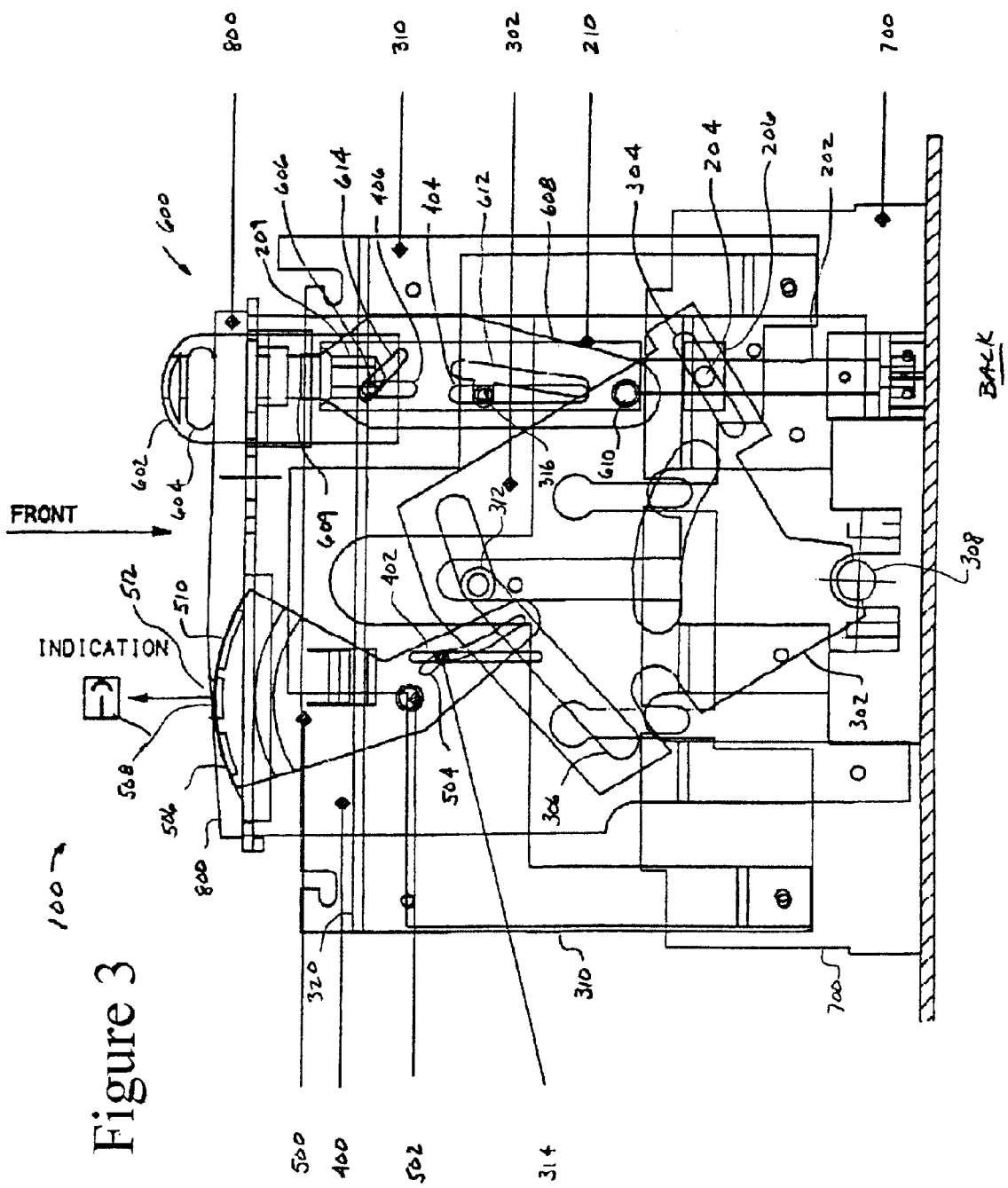
FIG. 3 is side view of the draw-out mechanism of FIG. 1 in the DISCONNECT position.
Figure 4:
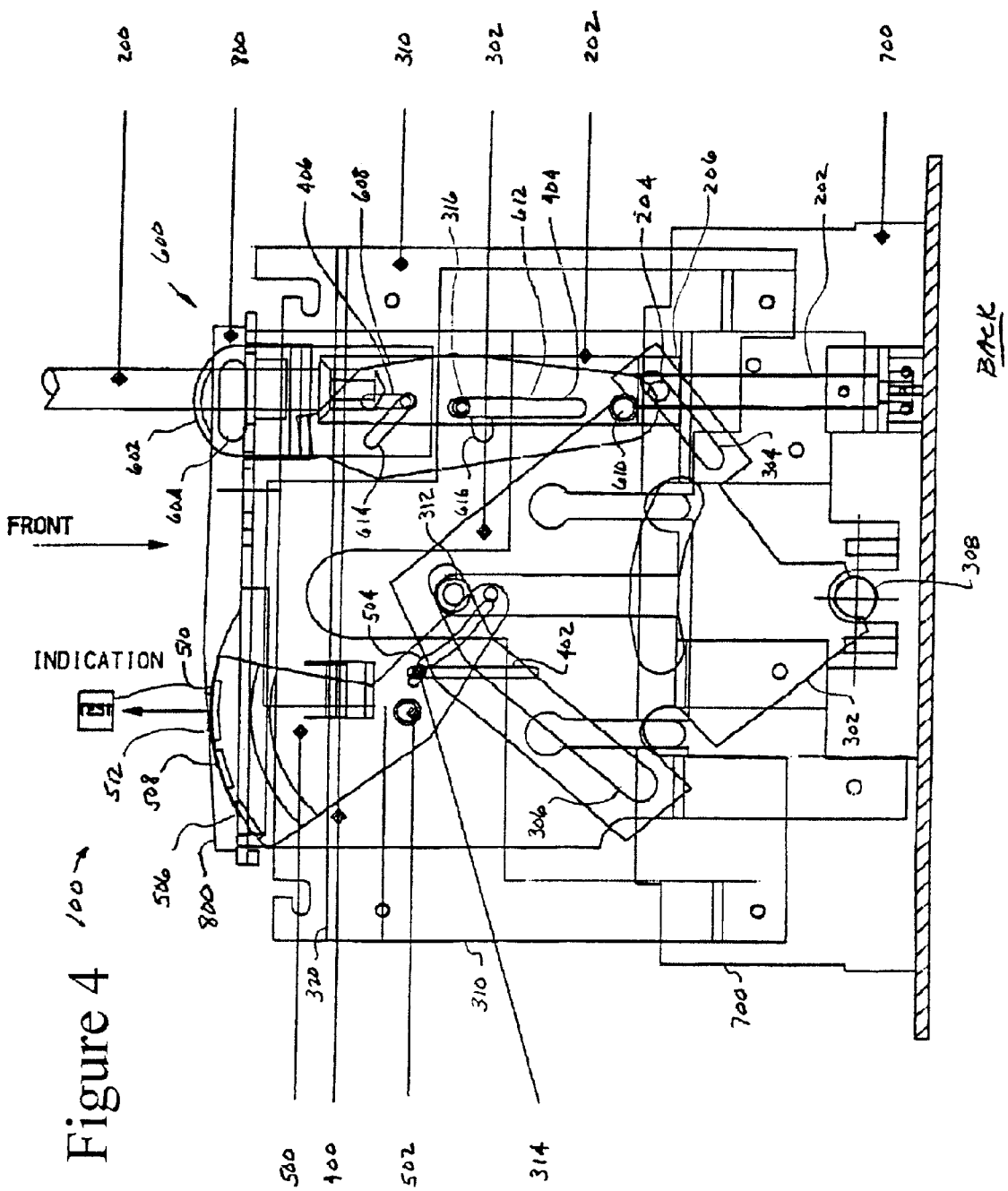
FIG. 4 is a side view of the draw-out mechanism of FIG. 1 in the TEST position.
Figure 5:
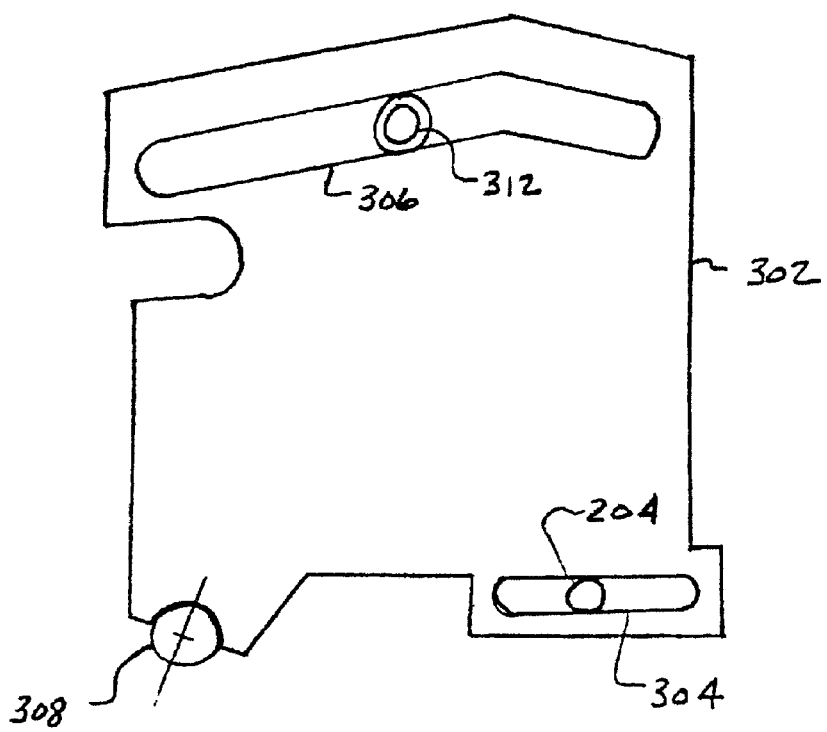
FIG. 5 is a side view of the cam of the draw-out mechanism of FIG. 1.
Figure 6:
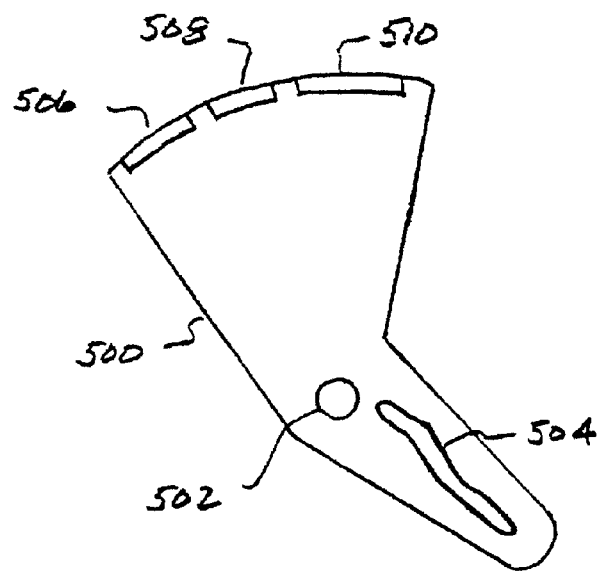
FIG. 6 is a side view of the indicator of the draw-out mechanism of FIG. 1.
Figure 7:
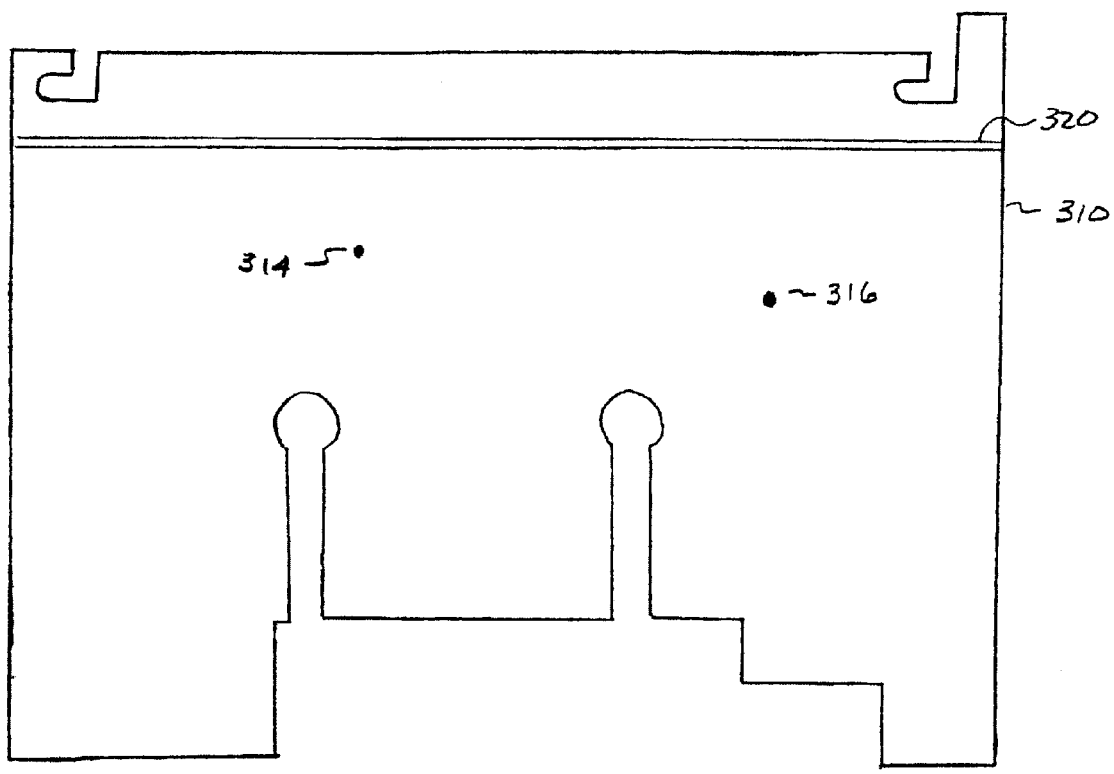
FIG. 7 is a side view of a mobile side plate of the draw-out mechanism of FIG. 1.
Figure 8:
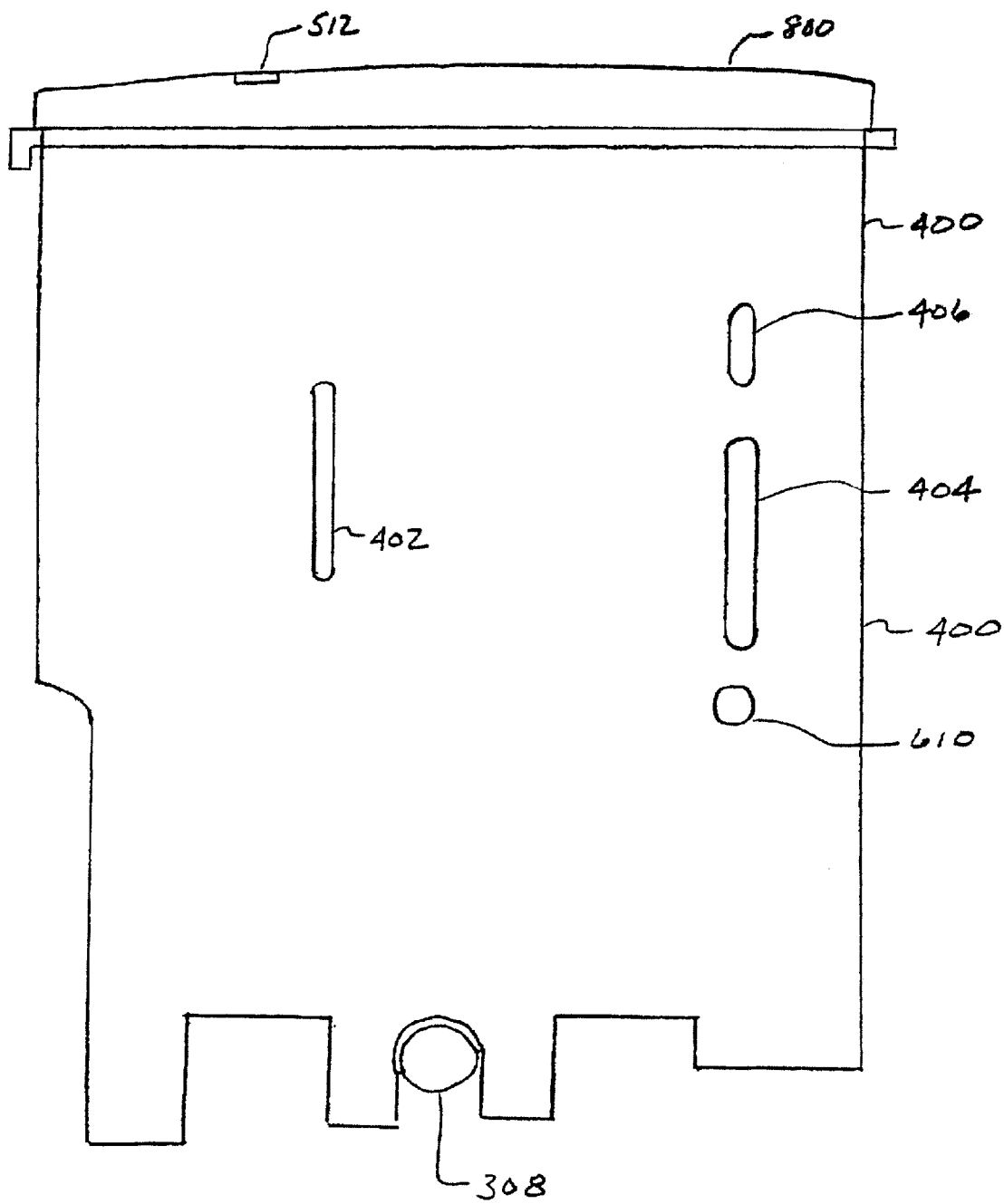
FIG. 8 is a side view of one of a pair of fixed side plates of the draw-out mechanism of FIG. 1.
Figure 9:
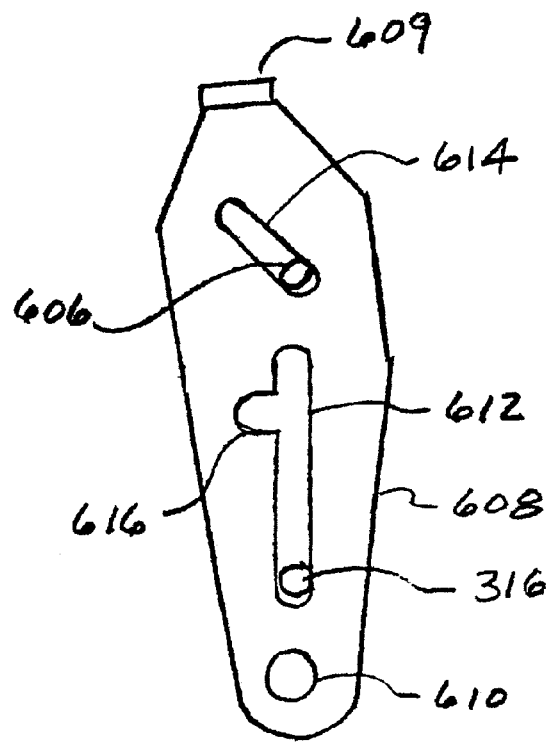
FIG. 9 is a side view of the obstructor plate of the draw-out mechanism of FIG. 1.
Figure 10:
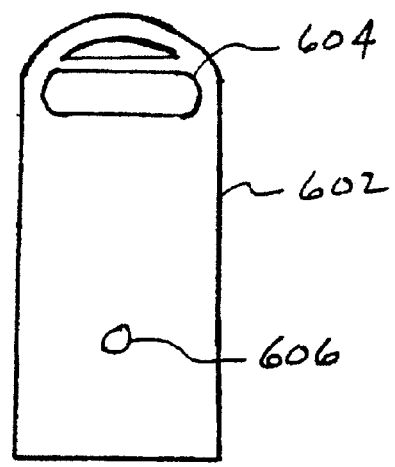
FIG. 10 is a side view of the locking slide of the draw-out mechanism of FIG. 1.

Reference will now be had to FIGS. 2, 3 and 4 of the drawing to explain the mechanical configurations assumed by the draw-out mechanism 100. In the interest of clarity, reference is also made to FIGS. 5 through 10 of the drawing. In FIG. 2, the draw-out mechanism 100 is in the CONNECT position which is indicated by a graphic 506 on the indicator 500 that can be viewed through the indicator port 512. A crank 200 is inserted through a crank port 208 in the command box 800 and into a socket 209 formed in a sleeve 210. Sleeve 210 is secured to a screw 202 thereby allowing crank 200 to turn the screw 202. The crank 200 and screw 202 in combination extend essentially the full depth of the draw-out mechanism 100 from front to back. At the back end of the screw 202 a threaded collar 206 is threadably engaged to the screw 202. The collar 206 includes a pin 204 affixed thereto and disposed within a slot 304 in a cam 302 of a cam system 300. The crank 200, screw 202, collar 206 and cam 302 in combination operate such that as the crank 200 rotates, the collar 206 translates along the screw 202. The movement of the pin 204 disposed in the slot 304, rotates the cam 302 counterclockwise as viewed about a axis of rotation 308 affixed to the fixed side plate 400. A pin 312 is affixed to the mobile side plate 310 and disposed within a slot 306 of the cam 302. As the cam 302 rotates about the axis of rotation 308, due to the action of the pin 204 and collar 206, the pin 312 moves within slot 306 causing mobile side plate 310 to move toward the front of the draw-out unit 100.

Continuing in FIG. 2, the mobile side plate 310 has a pin 314 affixed thereto. The indicator 500 is affixed to the fixed side plate 400 at a axis of rotation 502 and free to rotate thereabout. The indicator 500 further comprises a slot 504, which partly coincides with or overlaps a slot 402 in the fixed side plate 400. The aforesaid pin 314 is disposed in the slot 402 in the fixed side plate 400 and in the slot 504 in the indicator 500. Thus as the mobile side plate 310 moves, so moves the pin 314 along both the slot 402 and the slot 504. This motion causes the indicator 500 to rotate about the axis of rotation 502 so that the graphic 508 indicating the DISCONNECT position is visible through indicator port 512. Thus, from the CONNECT position, the rotation of the crank 200 and the screw 202 rotates the cam 302 about the axis of rotation 308 moving the mobile side plates 310, 318 from the back of the draw-out mechanism 100 toward the front thereof, and rotating the indicator 500 counterclockwise about the axis of rotation 502. The circuit breaker, which is attached to mobile side plate 318, also moves toward the front of draw-out unit 100, unplugging the circuit breaker from the main circuit. Thus, the draw-out mechanism 100 assumes the DISCONNECT position of FIG. 3.

Continuing in FIG. 2, the draw-out mechanism 100 is further comprised of a locking system 600. The locking system 600 includes a locking slide 602 and an obstructor plate 608. The locking slide 602 includes a locking hole 604 and a pin 606 affixed thereto. The obstructor plate 608 includes an axis of rotation 610 about which the obstructor plate 608 is free to rotate. The axis of rotation 610 is affixed to the fixed side plate 400. The obstructor plate 608 further includes a slot 614 and a slot 612 having a notch 616. The locking system 600 is operative such that as the mobile side plate 310 moves from back to front due to the action of the crank 200 and screw 202, a pin 316 attached to the mobile side plate 310 and disposed within the slot 612 and a slot 404 in the fixed side plate 400, moves therewith within the slots 612, 404. When the draw-out mechanism 100 has assumed the DISCONNECT position, the pin 316 is aligned with the notch 616. The crank 200 is removed from the draw-out mechanism 100 and the locking slide 602 may be manually pulled in a direction away from the draw-out mechanism 100. As such, the pin 606, disposed within an slot 406 in the fixed side plate 400, so moves and, engaged also with the slot 614, causes the obstructor plate 608 to rotate clockwise as viewed about the axis of rotation 610 until the pin 316 is captured by the notch 616. This action essentially aligns the obstructor plate 608 along with the screw 202 and a flange 609 extending from the obstructor plate 608 covers the socket 209 to prevent the crank 200 from being reinserted into the draw-out mechanism 100 in the DISCONNECT position shown in FIG. 3. The locking hole 604 is clear of the command box 800 and a lock (not shown) may be placed therein to prevent the draw-out unit 100 from being placed in the TEST or DISCONNECT positions. Because pin 316 is captured in notch 616, mobile side plate 310 is fixed in the DISCONNECT position to further insure that the draw-out unit 100 is not placed in the TEST or DISCONNECT positions. In alternative embodiments, the obstructor plate 608 extends from draw-out mechanism 100 and is pivoted about axis 610 by hand. As such, locking slide 602 is not necessary. Additionally, obstructor plate 608 may be biased in a counter-clockwise direction about axis 610 using, for example, a spring extending from the fixed side plate 400 to the obstructor plate 608. Biasing the obstructor plate 608 would pivot the obstructor plate 608 such that notch 616 captures pin 316 as soon as crank 200 is removed, provided that the draw-out mechanism 100 is in the DISCONNECT position.

Continuing in FIG. 3, in order for the draw-out mechanism 100 to proceed from the DISCONNECT position to the TEST position, the aforesaid lock is removed from the locking hole 604 and the locking slide 602 is manually pushed into the draw-out mechanism 100. Such action rotates the obstructor plate 608 counterclockwise as viewed, thereby disengaging the pin 316 from the notch 616 and allowing the crank 200 to be reinserted into the draw-out mechanism 100 to engage the socket 209. Upon further rotation of the crank 200, the screw 202 and the pin 204 continue to move to the front of the draw-out mechanism 100 and continue to rotate the cam 302 counterclockwise as viewed. As such, the slot 306 drives the pin 312, the mobile side plates 310 and 318, and the circuit breaker towards the front of the draw-out mechanism 100. In addition, pin 314 continues to move along the slot 402 and the slot 504. This in turn continues to rotate the indicator 500 counterclockwise as viewed about the axis of rotation 502 until the graphic 510 representing the TEST position of FIG. 4 is viewable through the indicator port 512. The draw-out mechanism 100 may be returned to the DISCONNECT or CONNECT positions from the TEST position by reversing the aforesaid action of the crank 200 and the screw 202.

Cam 302, indicator 502, mobile and fixed side plates 310, 400 and obstructor plate 608 are substantially flat structures that can be arranged in close proximity to each other creating a compact draw-out mechanism 100. Thus, the draw-out mechanism 100 provides a compact arrangement allowing the associated circuit breaker to be placed in CONNECT, DISCONNECT and TEST positions. Because the draw-out mechanism 100 is compact, it can be used with smaller sized circuit breakers. In addition, the draw-out mechanism 100 provides position indicator and locking features within the compact arrangement.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A draw-out mechanism for mounting a circuit breaker within a switchgear cabinet, the draw-out mechanism including:
   a fixed side plate arranged for mounting within the switchgear cabinet;
   a mobile side plate including a first pin extending therefrom, said mobile side plate being arranged to move the circuit breaker in cooperation therewith;
   a cam pivotally disposed on said fixed side plate, said cam including a first slot disposed therein, said first slot accepting said first pin; and
   wherein said first pin slides within said first slot as said cam pivots for moving said mobile side plate relative to said fixed side plate.

2. The draw-out mechanism of claim 1, further including:
   a screw;
   a handle arranged to rotate said screw; and
   a collar threadably engaged to said screw for translating along said screw as said screw is rotated, said collar including a second pin extending therefrom, said second pin extending within a second slot disposed in said cam for pivoting said cam as said screw is rotated.

3. The draw-out mechanism of claim 1, further including:
   an indicator pivotally mounted to said fixed sideplate, said indicator including a second slot;
   said mobile side plate including a second pin extending therefrom, said second pin extending within the second slot for pivoting said indicator upon movement of said mobile side plate.

4. The draw-out mechanism of claim 3, wherein said indicator indicates a position of the circuit breaker, said position selected from the group including CONNECT, DISCONNECT, and TEST.

5. The draw-out mechanism of claim 4, wherein said indicator includes graphics representative of said CONNECT, DISCONNECT, and TEST positions, one of said graphics being visible through a port.

6. The draw-out mechanism of claim 1, further including:
   an obstructor plate pivotally mounted to said fixed side plate, said obstructor plate including a notch disposed therein; and
   wherein said mobile side plate includes a second pin extending therefrom, said second pin extending within said notch when the circuit breaker is in a DISCONNECT position to maintain the circuit breaker in said DISCONNECT position.

7. The draw-out mechanism of claim 6, further including:
   a locking slide slidably engaged to said fixed side plate, said locking slide including a third pin extending therefrom, said third pin extending within a second slot disposed in said obstructor plate, said locking slide for pivoting said obstructor plate to releasably engage said second pin within said notch.

8. The draw-out mechanism of claim 7, wherein said locking slide includes a locking hole disposed therein, said locking hole being arranged to accept a lock for preventing movement of said locking slide.

9. The draw-out mechanism of claim 6, wherein said obstructor plate is biased in a direction for engaging said second pin within said notch.

\* \* \* \* \*